US 6,662,983 B2

(12) United States Patent
Lane et al.

(10) Patent No.: US 6,662,983 B2
(45) Date of Patent: Dec. 16, 2003

(54) MULTI-CONFIGURATION, MULTI-PURPOSE RACK SYSTEM

(76) Inventors: David A. M. Lane, 1700 E. Main St., Ashland, OR (US) 97520; John R. Lean, 937 Brookdale Ave., Medford, OR (US) 97504

( * ) Notice: Subject to any disclaimer, the term of this patent is extended or adjusted under 35 U.S.C. 154(b) by 127 days.

(21) Appl. No.: 10/096,013

(22) Filed: Mar. 11, 2002

(65) Prior Publication Data

US 2003/0168487 A1 Sep. 11, 2003

(51) Int. Cl.[7] ................................................. B60R 9/00
(52) U.S. Cl. ....................... 224/405; 224/499; 224/501; 224/510; 224/521; 108/44; 296/26.05; 296/26.09; 296/26.13
(58) Field of Search ................................. 224/405, 495, 224/497, 499, 501, 510, 519, 521, 549, 552, 554; 108/44; 296/26.05, 26.09, 26.13

(56) References Cited

U.S. PATENT DOCUMENTS

| | | | |
|---|---|---|---|
| 5,460,304 A | 10/1995 | Porter et al. | 224/521 |
| 5,518,159 A | 5/1996 | DeGuevara | 224/488 |
| 5,649,656 A | 7/1997 | Davy | 224/405 |
| 5,649,732 A * | 7/1997 | Jordan et al. | 296/26.1 |
| 5,752,639 A * | 5/1998 | Rice | 224/521 |
| 5,820,004 A | 10/1998 | Lane | 224/485 |
| 5,842,615 A | 12/1998 | Goodness | 224/509 |
| 5,938,092 A | 8/1999 | Johnson | 224/521 |
| 5,950,890 A | 9/1999 | Darby | 224/402 |
| 6,010,049 A | 1/2000 | Stein | 224/485 |
| 6,050,627 A * | 4/2000 | Lee | 296/26.09 |
| 6,155,623 A * | 12/2000 | Lane | 224/521 |
| 6,179,184 B1 | 1/2001 | Belinky et al. | 224/510 |
| 6,237,823 B1 | 5/2001 | Stewart et al. | 224/509 |
| 6,237,824 B1 | 5/2001 | Bagley | 224/521 |
| 6,511,088 B2 * | 1/2003 | Kahlstorf | 224/521 |

OTHER PUBLICATIONS

Disclosure Document 479,340, 2000, Lane, Sep. 5, 2000.
Disclosure Document 495,814, 2001, Lane, Jun. 21, 2001.
Disclosure Document 504,233, 2002, Lane, Jan. 24, 2002.
Adjustable Cargo Carrier, 2002, www.dualportsystem.com/products/adjustable.shtml.
Truck Bed/Roof Rack Extender, 2002, www.dualportsystem.com/accessories/bedextender.shtml.
Terragate2 2002, www.yakima.com/products/dynamic/8002570–2.html.

* cited by examiner

Primary Examiner—Nathan J. Newhouse

(57) ABSTRACT

A multi-configuration, multi-purpose rack system which has at least 20 separate and useful configurations for carrying a very wide variety of objects on a vehicle. The rack system is economical to manufacture, easy to use, and may be disassembled into its component parts, stored in it's own folding platform and conveniently carried in the cargo area of a vehicle. The rack system is comprised of at least one "L" shaped member (3), either leg of which can be removably attached to a vehicle; at least one extension (8) which can be telescopically inserted into either leg of the "L" shaped member; at least one crossbar (11) which can be slidably attached to the "L" shaped member or to the extension; at least two elongate members (14) which can be slidably attached to the crossbar; and a folding platform (17) which, when laid flat on the elongate members and the crossbar, can be used as an all-purpose cargo platform, and which can also be folded into a three sided housing to securely store the rest of the rack system parts for packing, shipping, display and storage.

14 Claims, 11 Drawing Sheets

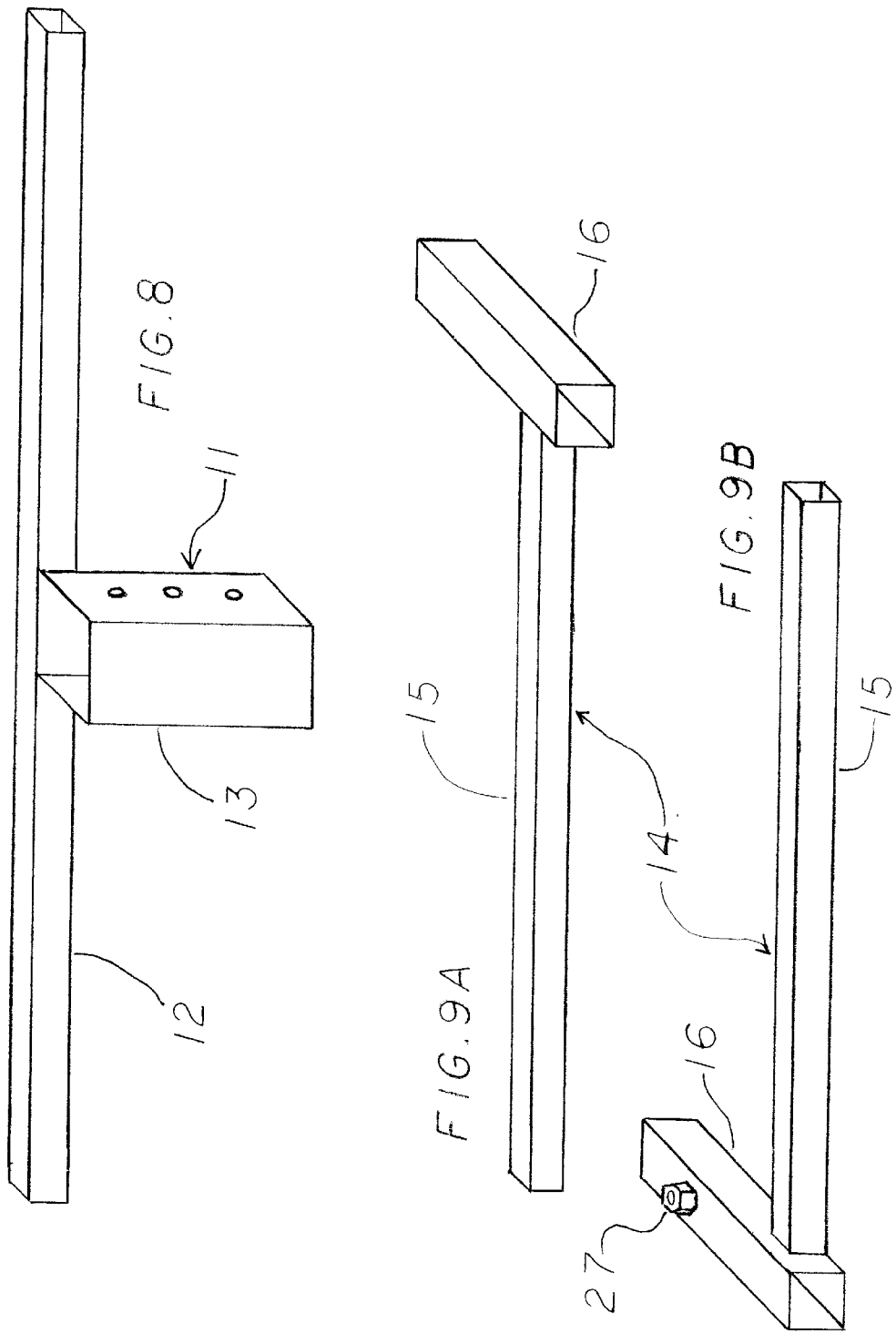

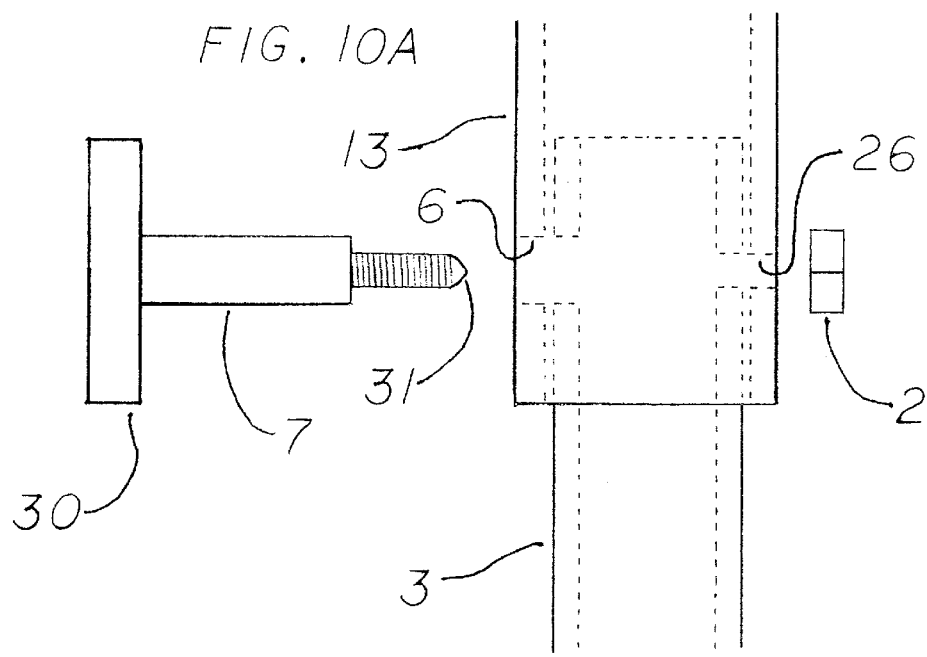
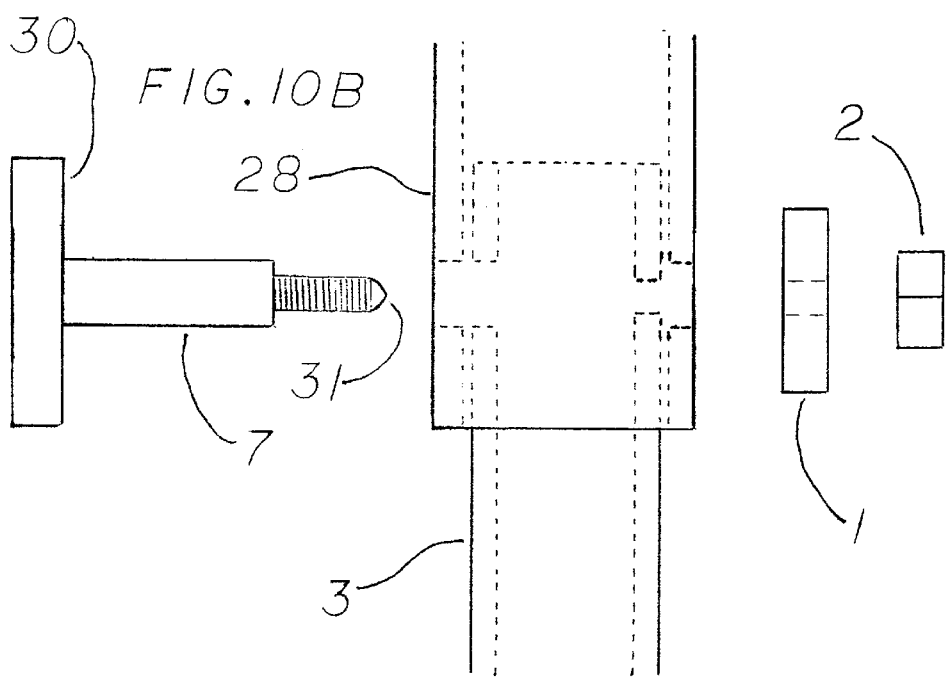

MULTI-CONFIGURATION, MULTI-PURPOSE RACK SYSTEM

David Andrew Milo Lane, the inventor of the U.S. Pat. No. 5,820,004 and Disclosure Documents 479,340, 495,814 and 504,233 which, by reference, are incorporated into and made part of this document, is also the co-inventor of the current multi-configuration, multi-purpose rack system for a vehicle.

FIELD OF THE INVENTION

This invention relates to a multi-configuration, multi-purpose rack system for transporting a large variety of objects on a vehicle, and a novel and unique means to package, ship, display and store the rack system.

BACKGROUND OF THE INVENTION

There are a variety of vehicle racks on the market, however most are single use, e.g., bike racks, ski racks, etc. A few racks claim to be multi-purpose, however they become multi-purpose only with the inclusion of added-cost accessories. The new Reese/Draw-Tite "Dual Port System" carries this to the extreme, having 11 accessories, only two of which are capable of being used for more than a single purpose (see at "dualportsystem.com"). Both Porter, et. al., U.S. Pat. No. 5,460,304, and Goodness, U.S. Pat. No. 5,842,615, claim a "modular vehicle [carrier/rack] system". Both become multi-functional only by adding extra-cost accessories.

Stein, U.S. Pat. No. 6,010,049 claims, "A vehicle receiver mounted cargo carrier is readily configured to transport bicycles, skies and poles, canoes, snowboards, canoe paddles and other cargo through the use of a vertical frame into which various rods may be placed, at locations most suited for the specific cargo." While Stein's basic rack can be configured in several variations of a single design theme to carry primarily, light weight and flat objects, e.g., skies, his design also requires added-cost accessories to carry the bicycles and canoe he claims.

Darby's U.S. Pat. No. 5,950,890 is unique in that it can be used as both a bed extender for a pickup and as the rear portion of a roof-height carrier. This design, while being dual purpose, suffers from the inherent size and non-extensibility of the members: to be tall enough to reach from a receiver trailer hitch to the top of the roof rack of the tallest SUV, one side of his "L"-section must be well over four feet long. In addition, his "T" bar is non-extensible and must also be over four feet long in order to carry four-foot wide sheet goods. These sizes pose problems for packaging and shipping, and their non-extensibility limits the applications since some vehicles will be either too tall or too short to accommodate these non-extensible members. In addition, Darby claims that his rack requires "only a small amount of storage space such as behind the seat of a pickup truck." His design makes no provision for housing these large pieces behind the seat, so they would be free to rattle and move about, possibly being thrown violently from side to side within the vehicle during emergency maneuvers or on a curvy road. This could damage the truck and could potentially injure passengers. Further, due to their size, there is no convenient way to carry these pieces in a van or SUV.

Bagley's U.S. Pat. No. 6,237,824 claims to be a "rack system" because it can be used "for carrying canoes, bikes, or luggage type items", however his design results in one piece being used to carry bikes and another piece being used to carry the rear portion of a canoe or other long object. Both, or either of these separate, unrelated pieces can be attached to a vertical mast, but neither is integrated with the other. Bagley does claim a "substantially rigid . . . panel being positionable on" the bicycle carrying rods. This rigid panel is only an accessory to the his core "rack system" and suffers from several deficiencies: 1) the width of materials which can be carried on his panel is restricted by the width of the bike rack portion of his invention (typically these bike carrying rods are about eighteen inches apart); 2) a rigid panel poses problems for shipping and storage; 3) Bagley's panel cannot be attached to his lower "support arm" which limits the lowest height at which the panel can be utilized, and thus reduces the convenience of placing objects on the panel; 4) it is obvious from Bagley's design that the carrying capacity of this rigid panel is quite limited; and, 5) Bagley makes no provision for carrying his rack in a vehicle, or for easy storage at the owner's home. By combining several of the functions, e.g., carrying both a canoe and bicycles, his rack can be configured in a maximum of five separate ways.

(In the following sections, reference will be made to FIGS. 12A–12T, which are schematic representations of the 20 most useful and practical configurations of the current invention. In each of these 20 figures, the line projecting to the left represents the connection point to a receiver hitch. Eleven of the figures have short line segments at right angles to and bisecting a longer line—these represent connection points between various pieces of the rack system. FIGS. 12D, E, F & R represent the folding platform resting on the horizontal segment of the crossbar and on the elongate members. The reader may wish to familiarize himself/herself with all of the FIGS. associated with this application before proceeding.)

This co-inventor's U.S. Pat. No. 5,820,004 is the only prior art which is a true multi-configuration, multi-purpose rack, whose parts can be assembled in multiple ways to form a variety of configurations for carrying a wide variety of objects without resorting to added-cost accessories. That design could be configured in only seven ways—see FIGS. 12A, B, C, D, E, H & I, whereas the current invention can be configured in 20 separate and useful ways, see FIGS. 12A–12T—a tripling of the number of configurations. Since U.S. Pat. No. 5,820,004 was issued, a great deal of time and engineering effort have gone into increasing the flexibility of the rack system while reducing the number of parts needed and greatly simplifying the overall construction of the rack system, e.g., each of the five metal pieces consists of only two simple pieces of metal tubing welded together. The only machining required is drilling holes and grinding some of the welds smooth, which keeps manufacturing costs to a minimum.

The current invention consists of the following changes to U.S. Pat. No. 5,820,004: replacing the novel, anti-wobble connector to a receiver hitch with a much simpler, but still novel, anti-wobble connector; replacing the novel, anti-wobble attachment means and the vertical bar with an "L" shaped member; reducing the height of the vertical bar/"L" shaped member; the addition of an extension bar to the "L" shaped member; adding the same type novel connector means used between the "L" shaped member and a hitch receiver to the connection between the "L" shaped member and the extension, and to the connection between the crossbar as it attaches to either the "L" shaped member or the extension to prevent wobble between these pieces; lengthening the slide means of each of the elongate members and changing the connection between each of the weight bearing segments and its attendant slide means producing an asymmetry with more of the slide means on one side of the elongate member than on the other side; sizing the weight bearing segment of each elongate member to telescopically slide into an end of the horizontal segment of the crossbar; changing the elongate members so that each is the mirror image of the other; a reduction in the length of the horizontal segment of the crossbar, and a slight, but important change to the configuration of the crossbar to allow it to be used to transport large sheet goods, e.g., a sheet of plywood, without damaging the sheet goods. The result of all these changes is to make the five metal pieces of the rack system simpler and less expensive to manufacture, sturdier and safer, easier to assemble, and much more flexible in the number of separate configurations it can assume, and therefore in the number and variety of objects it can carry. When used with an optional roof rack, the current invention can transport virtually every type of sports equipment, including bikes, skis, snowboards, canoes, kayaks, surf and sail boards, as well as practical items such as lumber and building supplies up to 5 m. (16 ft) long and up to 135 kg. (300 lbs). The current invention can also carry lawn and garden supplies, camping and outdoor equipment, luggage, furniture, cargo containers and even some appliances.

A further enhancement which is derived from the above changes is the modification of the folding platform such that it need have only two hinged areas as opposed to the multiple sets of hinges of the original platform. A further change to the folding platform such that it can be made to house the rest of the rack when not in use—this greatly simplifies the packaging, shipping, display, storage and use of the entire rack system. By sizing the platform and it's contents to fit the cargo area of a vehicle, the current invention can easily be carried in a vehicle's cargo area for use at any time. In practice, this results in a package of approximately 12 cm×30 cm×100 cm (5"×12"×40")= approximately 36 cubic decimeters (1.5 cubic feet), which weighs approximately 23 kg (50 pounds). No other vehicle rack has been specifically designed and sized to keep packaging requirements to a minimum, and to be carried conveniently in a vehicle's cargo area. This increase in convenience and reduced cost of packaging provides advantages never before appreciated or actualized in this art. Certainly, the combination of all of the above changes to U.S. Pat. No. 5,820,004, with a resultant tripling of the number of configurations the current invention can assume, would not have been obvious to one with average skill in the art of vehicle rack design.

More specifically, the following changes were made to U.S. Pat. No. 5,820,004:

1. The single "L" shaped member (Item 3 in FIGS. 1, 2, 7A, 7B & 11) is constructed from only two pieces of metal which are cut to length, the holes are drilled and the two pieces are welded together. This is much simpler and less expensive than the connector (Items 8 & 15) and vertical bar (Items 20 & 21) of U.S. Pat. No. 5,820,004, which required 11 separate pieces of metal and nine welds. The "L" shaped member of the current invention is similar to Darby's "L" section, however the longer leg of the current "L" shaped member is considerably shorter than Darby's. This difference in length poses several non-obvious advantages over Darby's design: A) attaching the shorter leg of the "L" shaped member to a receiver hitch with the extension attached to the longer leg, and the crossbar attached to the larger end of the extension, produces the rear portion of a variable-height roof rack which can be extended from approximately 90 cm (3 ft) to 1.5 m (5 ft) to better match the height of the roof rack on the vehicle (FIGS. 12H–12J); B) attaching the extension piece of the current invention to a receiver hitch, and then attaching the longer leg of the "L" shaped member to the extension, with the shorter leg pointing vertically, and attaching the crossbar to the shorter leg, produces the only design available for a variable length bed extender (FIGS. 12N–12P), with the advantages of being able to accommodate the needs of a wider variety of vehicles, conditions and loads; C) the weight and length of the "L" shaped member are reduced, making it easier to handle, store and ship; and D) the shorter length allows for an additional function: to be conveniently stored within a vehicle.

Darby's "L" section can function in only two modalities: with either the shorter leg or the longer leg attached to a receiver hitch. In contrast, the "L" shaped member of the current invention, in conjunction with the extension, can function in six separate configurations: when the shorter leg is attached to a receiver hitch, the longer leg of the "L" shaped member can serve as the attachment point for either, 1) the crossbar (FIGS. 12A–12E), or 2) the extension (FIGS. 12F–12J); when the longer leg of the "L" shaped member is attached to a receiver hitch, the shorter leg can serve as the attachment point for either 3) the crossbar (FIGS. 12K–12M), or 4) the extension (FIGS. 12Q–12T); and when the extension is attached to a receiver hitch, either 5) the longer leg (FIGS. 12N–12P) or 6) the shorter leg (not shown, but similar to 12Q–12T) of the "L" shaped member can be attached to it.

2. The extension (Item 8 of FIGS. 1, 2, 6A, 6B & 11) of the current design is similar to Bagley's extension, however Bagley never labeled his as an extension, but merely refers to it as the "first portion" of "a leg portion". Bagley's bike carrying rods cannot be attached to the lower section of his "leg portion". Since Bagley's rigid panel attaches to the bike carrying rods, this prohibits his panel from being lowered to near the bumper height of the vehicle, which thereby makes it more cumbersome and potentially dangerous to load objects on the panel at the higher level. In contrast, the extension of the current invention differs from Bagley's in that it has a larger end which is similar in size and shape to the material of the "L" shaped member, and a smaller end which is sized to telescopically be inserted into either leg of the "L" shaped member (FIGS. 6A & 6B). This difference allows the crossbar to be mounted to either leg of the "L" shaped member or to the larger end of the extension. In turn, this allows the crossbar to be positioned over the full length of the "L" shaped member and also to be extended, along with the extension, to assume a position convenient for loading a wide variety of cargo, whether that be at bumper height or at roof top height, or at graded heights in between. While Bagley's "first portion" can only be inserted into his "leg portion", the extension of the current invention can be used in five separate configurations of the rack system: 1 & 2) when either leg of the "L" shaped member is connected to a receiver hitch, the extension can be telescopically inserted into the free leg (FIGS. 12F–12J, and FIGS. 12Q–12T); 3 & 4) when the larger end of the extension is attached to a receiver hitch, either leg of the "L" shaped member can be attached to the smaller end of the extension (FIGS. 12N–12P, and similar, but not shown, to FIGS. 12Q–12T); and, 5) the extension can be telescopically inserted into the longer leg of the "L" shaped member for convenient storage (FIG. 3). Thus, the construction of the extension with different sized ends greatly expands its usefulness in a serendipitous way over Bagley's "first portion" which can be used in only one way.

3. DeGuevara, U.S. Pat. No. 5,518,159, shows a novel and simple means to prevent wobble between a rack and a receiver hitch, and between rack members, consisting of a shoulder bolt and different sized holes in the rack pieces. The current invention uses improved shoulder bolts (Item 7 in FIGS. 1, 10A & 10B), plus the addition of a crucial, strong washer (Item 1 in FIGS. 1 & 10B) at the receiver hitch attachment, to accomplish the same ends. While DeGuevara writes that his "connector member" can be used to attach his rack to a "standard" receiver hitch, his "Description of the Invention", his FIG. 7 drawing and his claim No. 10, all depict and describe an atypical receiver, one with two different sized holes. Standard receivers have two holes of equal size through which a retaining pin is usually passed. While DeGuevara shows a small washer under the nut on his connector member as it is attached to his atypical receiver, he doesn't bother to number it and makes no mention of it being important, and with his atypical receiver, it is of little importance. However, from experience, this inventor has found that using DeGuevara's design on a standard receiver, with two pin retaining holes of the same size, where the threaded segment of the shoulder bolt is substantially smaller than the hole in the receiver, a standard washer will deform into the hole under the stress of cargo attempting to sway from side to side during normal vehicle maneuvers. This deformation will ultimately result in unwanted wobble between the receiver hitch and the rack. It is crucial that the washer be strong enough to withstand the swaying forces without significant deformation. This seemingly insignificant, unobvious change results in a workable design when using a shoulder bolt with a standard receiver hitch, whereas DeGuevara's design would result in failure.

DeGuevara illustrates his shoulder bolts with just a slight curve on the non-threaded end, similar to a standard hitch retaining pin which has been modified to make it into a shoulder bolt. While not obvious, the size and shape of this curve would not allow the average person to manually apply adequate leverage to this curved end when a wrench is used to tighten or loosen a nut on the threaded end, resulting in the need, at least occasionally, to use some clamping device, e.g., pliers, to keep the curved end from turning while applying torque to the nut. The shoulder bolt of the current invention solves this problem by replacing DeGuevara's curved end with a "T" handle of a predetermined size (FIGS. 10A & 10B) to allow the average person to manually apply adequate torque to resist the turning force when a wrench is used to tighten or loosen a nut on the threaded end.

DeGuevara also illustrates his shoulder bolts with the threaded portion having a flat end. This inventor has found that this design can pose alignment problems when trying to insert the threaded end through the smaller holes (26). The current invention improves on this design by providing the threaded end with a rounded tip (31). This rounded tip is self-centering in the smaller holes thereby reducing alignment problems (FIGS. 10A & 10B).

The current invention improves on DeGuevara's design in yet another way: it has holes of different sizes (Items 6 & 26) on opposite sides of all three of the major structural members—the "L" shaped member, the extension and the crossbar (FIGS. 6A, 6B, 7A, 7B, & 8). DeGuevara limits the use of his "connector member" to only two of the four connection points in his design. By using standard nuts and bolts at the other two connection points, he re-introduces the possibility of "relative movement" between rack pieces which he sought to avoid. The current invention uses shoulder bolts, in conjunction with the larger and smaller holes, at all three major connecting points to eliminate all possible wobble or other unwanted movement.

As with other parts of the current invention, the shoulder bolts (7) and attendant nuts (2) serve more than one function:

1) they securely connect the three major pieces of the rack system together, and 2) they hold the crossbar securely within the folding platform for packaging, shipping, display and storage—see FIG. 3 and FIG. 4.

4. The crossbar of this co-inventor's U.S. Pat. No. 5,820, 004 is similar to the crossbar of the current invention with two subtle, but important changes:

A) The crossbar of U.S. Pat. No. 5,820,000 had a small extension of the vertical segment which extended above the horizontal segment. The purpose of this extension was to project o through the square hole in the platform to securely locate the platform. With the crossbar being used as a terminal piece of the rack in both the bed extender position (FIGS. 12K–12P) and in the roof rack position (FIGS. 12H–12J), this small extension would keep sheet goods, e.g., a sheet of plywood, from resting on the horizontal bar and would also tend to scratch anything resting on it. The solution to this problem involved attaching the vertical segment of the crossbar to the horizontal segment so that the vertical segment is flush with or lower than the upper surface of the horizontal segment (FIG. 8). This simple change results in a greatly expanded utility of the crossbar.

B) The length of the horizontal (or longer) segment of the crossbar was shortened. This allowed the crossbar to be housed within the folding platform (FIG. 3) and for the whole rack package to be carried in the cargo area of a vehicle, specifically an SUV. While SUV's are generally considered large vehicles, the usable cargo space behind the third row of seats and between the wheel wells of most SUV's is as small as 100 cm (40") wide, and is rarely wider than 112 cm (44"). In practice, the crossbar of the current invention was shortened to approximately 90 cm (36"). Thus, the shortening of the crossbar allows for two additional advantages never before actualized in this art: to be conveniently stored within the cargo area of a vehicle, and to be conveniently and economically packaged.

While Bagley's crossbar can be used for only one purpose, and Darby's crossbar can be used in both of his configurations, the crossbar of the current invention can be used in seven separate configurations of the rack system: when the "L" shaped member's shorter leg is attached to a receiver hitch, the crossbar can be attached to either 1) the "L" shaped member's longer leg (FIGS. 12A–12G) or 2) to the extension (FIGS. 12H–12J); when the "L" shaped member's longer leg is attached to a receiver hitch, the crossbar can be attached to either the 3) shorter leg (FIGS. 12K–12M) or 4) to the extension (FIGS. 12S & 12T); configurations 5 & 6: when the extension is attached to a receiver hitch and either leg of the "L" shaped member is attached to it, the crossbar can be attached to the free leg of the "L" shaped member (FIGS. 12N–12P, and similar to, but not shown, 12Q–12T); and, 7) when packaged in the folding platform, the crossbar helps to hold the elongate members in place (FIG. 3).

5. Bagley, Davy, U.S. Pat. No. 5,649,656, and Johnson, U.S. Pat. No. 5,938,092, have all designed their crossbar extensions as single use items, and each inventor shows multiple holes in his crossbar extensions to provide for adjustment in the overall width of the load carrying surface, with positive cargo stops on the outer ends of these extensions. This poses a potential problem for cargo narrower than the narrowest adjustment which each of these three designs offer: no positive cargo stops. The current invention solves this problem by modifying the elongate members of U.S. Pat. No. 5,820,004 as follows: the slide means segment of these members has been elongated, and the longer, weight-bearing segment has been moved off-center to make a resulting asymmetrical design of the two members, mirror images of each other (Items 14 in FIGS. 1, 2, 9A & 9B). In addition, the weight-bearing segment has been sized to telescopically slide into either end of the horizontal segment of the crossbar. For cargo narrower than the crossbar, the slide means segment of the elongate members can be slid on the horizontal segment of the crossbar, with the longer, weight-bearing segment of the members pointing vertically (FIGS. 12I, L & O). The distance between the two elongate members can be adjusted to any desired width, down to 3 cm (1") to provide positive cargo stops. For cargo wider than the crossbar, the weight-bearing segments of the elongate members can be telescopically inserted into the ends of the crossbar, with the longer segments of the slide means situated vertically to serve as positive cargo stops (FIGS. 12J, M & P). Utilizing the elongate members in both of these configurations, cargo from 3 cm (1") wide up to 1.85 m (6 ft.) wide can be accommodated, providing positive cargo stops on both sides of the cargo.

Whereas the other three inventors' extensions serve only a single function, the modified elongate members of the current invention can function in five separate modalities: as load carrying members on which cargo is placed (FIGS. 12A, G & Q), as support to the all-purpose cargo platform (FIGS. 12D, E, F, & R), as load carrying members from which cargo can be suspended (FIGS. 12B, C, S & T), as crossbar extensions (FIGS. 12J, M & P) and as crossbar ends (FIGS. 12I, L & O).

There is one further improvement in the crossbar extensions over previous art: no holes need to be drilled in the extensions, and no pins, nuts and bolts, or other connectors are needed to keep the crossbar extensions in place. In practice, this inventor has found that when sufficient force is applied by a strap or other tie-down means, from the outer end of one extension, up and over the cargo load, and back to the outer end of the other extension, neither the load nor the extensions move. Under the influence of a tight tie-down means, e.g., a strap with a ratchet tightener, there is enough friction between the extension telescopically placed within the crossbar to negate the need for other connection means between these members. This simplifies construction and renders the extensions less expensive to manufacture. Further, the distance between the extension ends is continuously variable to better match the width of the load.

6. The folding platform of U.S. Pat. No. 5,820,004 has been modified significantly. The original design had multiple segments with multiple hinges which folded accordion-style for storage. It functioned as an all-purpose cargo platform/work surface/tail gate table. The folding platform of the current invention can still be used for all three of these purposes (FIGS. 12D, E, F & R), but it has three segments and two hinged areas which allow it to be folded into a three-sided container to house the rest of the rack pieces (FIGS. 1, 3, 4 & 5) for inexpensive packaging and shipping. Thus, the folding platform can be used in four separate configurations and it has specifically been sized to fit within the cargo area of a vehicle, which adds a fifth function: convenient storage. Bagley's rigid panel can serve only one function.

On the under side of the folding platform, locator means (FIG. 3, Items 21 & 21') have been added to locate the platform as it rests on the crossbar and elongate members, when it is being used as a cargo platform, etc. Additional holding means (FIG. 3, Items 22, 23 & 24) have also been added to the underside of the platform so that when it is being used to store the rest of the rack, the holding means firmly hold the five metal pieces of the rack in place for shipping, display and storage. A closure mechanism (FIG. 5, Item 25) has been added to the folding platform to hold it firmly closed when housing the metal parts.

There are several other dedicated cargo platforms on the market similar to Belinky, et. al., U.S. Pat. No. 6,179,184B1. Usually, they have a single, central member which attaches to a receiver hitch. This single member supports the center of the platform which is usually made of perforated and expanded sheet metal. Additional strength to keep the platform from bending under load is provided by solid metal edges extending above the rack surface two-to-three inches. These designs suffer from several deficits: 1) they are made all in one piece and are heavy and clumsy to attach and to remove from a receiver hitch, 2) they are too big to be stored within the vehicle conveniently, and 3) trying to carry a single object which is wider than the platform results in a portion of the cargo resting on the narrow metal edge where it could be easily damaged. When the cargo is wider than the platform, the weight of the cargo contacts the platform only at the outer edges which are farthest from the central support. This increases the leverage of the weight of the cargo to its maximum, increasing the possibility of bending the platform. Secondly, these existing designs have no vertical member. When attempting to transport tall items, there is nothing to support the cargo in the vertical direction creating the possibility the cargo could topple over, especially under hard braking, damaging both the cargo and the vehicle.

The current invention solves these problems by: A) not having vertical edges on the platform—cargo can extend over any edge and still be supported by the full breadth and width of the platform; B) the elongate members can be positioned anywhere along the underside of the platform to provide maximum support where it is most needed, whether that is near the center of the platform or at its edges, or anywhere in between; and C) when the shorter leg of the "L" shaped member is attached to a receiver hitch, and the platform is resting on the crossbar and the elongate members (FIGS. 12D & 12R), the longer leg of the "L" shaped member will be extending vertically up through the hole in the platform and can serve as a place to brace taller cargo and as a tie-down point to keep the cargo from toppling over. If needed, the extension can be attached to the longer leg to further extend the vertical capacity of the platform (FIG. 12F). Thus, cargo of 1.5 m (5 ft) or more in height could be safely transported, which would be impossible with the existing designs on the market. Finally, since the current invention is assembled, one piece at a time, it is much more convenient to attach it and remove it from a receiver hitch than the large, one piece cargo platforms.

While the platform could be constructed from a variety of materials, including plywood and strand board, it is envisioned that a rugged plastic with a molded-in honeycomb substructure would best serve all of the functions of the platform.

For shipping and sales display, this folded platform with the metal parts inside could have a sheet of information, e.g., text and pictures of the rack system in use, placed on top of the platform, and the whole package could be wrapped in clear shrink wrap material. The sales material and portions of the metal pieces could be clearly seen through the shrink wrap, negating the need for a curious shopper to "open the box" to inspect the contents. This would form an inexpensive packaging with no further need for a cardboard box or other packaging material. After removing the shrink wrap, this same configuration would allow the current invention to be stored in the cargo area of a vehicle for use at any time. This configuration would also make storage of the rack system more convenient at the owner's home. Modifying the folding platform and five rack pieces as described above, solved the problems of packaging, shipping, display and storage in one easy step, none of which have ever been successfully addressed by other rack designs.

A further unobvious advantage of the current invention over all other designs comes from attaching the longer leg of the "L" shaped member to a receiver hitch with the shorter leg pointing vertically, and attaching the extension to the shorter leg, with the cross bar attached to the larger end of the extension. This produces an entirely new type of rack: a rack which can safely and independently carry cargo several feet behind a vehicle to allow easy access to the rear of the vehicle (FIG. 11 and FIGS. 12Q–12T)—a similar, but more flexible configuration can be obtained by reversing the placement of the extension and the "L" shaped member. The configuration shown in FIG. 11 would be useful if the bed of the pickup were filled by a small boat, or other object, which extended slightly over the end of the lowered tail gate, and the owner wanted to also carry other items, such as several bikes, at the same time. This same configuration would allow easy access to the rear of an SUV without having to disturb the cargo.

Other designs have attempted to solve the problem of access to the rear of the vehicle by swinging the cargo away from the rear of the vehicle, similar to DeGuevara's U.S. Pat. No. 5,518,159. All of these designs known to this inventor are for bicycle and ski/snowboard racks—there are none suitable for other cargo. These designs, with their double members, connected together by a hinge, which extend from the receiver hitch to the side of the vehicle, add weight and complexity, and therefore cost to the designs, e.g., a Yakima "TerraGate" 2 bike hitch rack costs $319.00 (see: yakima.com). Also, these designs have no provision for staying in the open position, so if the vehicle is pointing down hill or tilting to the right, the rack with the bikes attached will tend to close, possibly damaging an open rear door or hatch. The current invention is so simple, strong and solid that it can safely carry up to 60 kg (130 lbs) approximately 1 m (1 yd) behind a vehicle with none of the limitations associated with prior art. Further, it can carry any cargo, not just bikes and skis/snowboards. The configurations shown in FIGS. 12Q–T are like no other rack.

The result of all of the above changes is a rack system which consists of five simple-to-manufacture metal pieces and a folding platform (FIG. 1). These six pieces can be configured in at least eight completely separate modalities with multiple variations of each configuration, producing at least 50 separate possibilities for configuring the rack system. The 20 most practical and useful configurations are depicted in schematic fashion in FIGS. 12A–12T. The other at least 30 possible configurations have been omitted on the basis that they are less likely to be used, having only minimal advantages over the 20 configurations depicted.

No other rack system can claim this much flexibility: eight separate modalities and at least 20 different and useful configurations. As mentioned above, U.S. Pat. No. 5,820,004 can be assembled in seven of those configurations (FIGS. 12A, B, C, D, E, H & I), and if U.S. Pat. No. 5,820,004 were combined with Darby's dual purpose rack, the following nine configurations could be produced: FIGS. 12A, B, C, D, E, H, I, K & L. But, that leaves the other 11 configurations (not to mention the at least 30 not shown) as serendipitous benefits which derive from the additional non-obvious modifications described in items 1–6 above.

Truly, there is a synergism to this design which allows it to be so simple and economical to manufacture and yet it can be configured in at least 20 different practical and useful ways to transport a very wide variety of items, and to be so convenient to package, ship, display, store and use, that the end result is much greater than the sum of the six parts of the rack system. Certainly, the means and the ends of the current invention are so unique that this design and its multiple configurations and functions would not have been obvious to one with average skill in the art of vehicle rack design.

SUMMARY OF THE INVENTION WITH OBJECTS

The subject of the current invention is a multi-configuration, multi-purpose rack system for transporting a wide variety of objects on a vehicle, and a unique means to package, ship, display and store the rack system. The five metal parts of the rack system are constructed out of readily available tubing which requires only simple cutting, machining and welding techniques to produce pieces which can slide together in at least 20 configurations. The rack system can be used either by itself or in conjunction with a separate roof rack. Depending on the configuration, this rack system can be used as:

1. a variable length bed extender to a pickup truck, SUV, van or even a car (FIGS. 12N–12P)
2. an entirely new type of rack which can safely and independently carry cargo several feet behind a vehicle to allow easy access to the rear of the vehicle (FIG. 11 and FIGS. 12Q–12T)
3. as a bicycle rack (FIGS. 12B & 12S)
4. as an all-purpose cargo platform (FIGS. 12D, F & R)
5. as a pair of horizontal arms, which can be positioned at various heights and whose spacing can be varied horizontally, on which to load cargo (FIGS. 12A, G & Q)
6. as a pair of horizontal arms, which can be positioned at various heights and whose spacing can be varied horizontally, from which cargo can be suspended (FIGS. 12C & T)
7. as a work surface or a tail gate table (FIG. E)
8. as the rear portion of a variable-height roof rack (FIGS. 12H–J)
9. as a base for easily attaching accessories to transport specialty items (FIGS. 12A–12C & FIGS. 12G–12J).

The general object of the current invention is to provide a new, multi-configuration, multi-purpose rack system for a vehicle with a unique means to package, ship, display and store the rack system which overcomes the limitations and drawbacks of prior art and which is not anticipated or rendered obvious by any prior art vehicle racks.

A specific object of the invention is to provide a rack system which can be assembled in at least 20 different and useful configurations to transport a wide variety of large and bulky objects on a vehicle.

Another specific object of the invention is to provide a rack system which is convenient and inexpensive to package, ship, display and store.

Another specific object of the invention is to provide a rack system of predetermined size which can be conveniently stored in the cargo area of a vehicle.

Another specific object of the invention is to provide a variable length bed extender.

Another specific object of the invention is to provide the rear portion of a variable-height roof rack.

Another specific object of the invention is to provide a rack which can safely and independently carry cargo several feet behind a vehicle to allow easy access to the rear of the vehicle.

Another specific object of the invention is to provide a means to firmly attach carrying racks to receiver hitches to minimize wobble between the rack and the receiver.

Yet another specific object of the invention is to provide a means to firmly attach the pieces of a rack together to minimize wobble between the pieces.

Yet another specific object of the invention is to provide a folding platform which can be used as an all-purpose cargo platform, as a shipping container, as a work surface, as a tail gate table, and as a housing for the rest of the rack pieces.

Another specific object of the invention is to provide a rack system in which each major piece can be utilized in multiple configurations and for multiple functions.

Another specific object of the invention is to provide a rack system in which all of the major pieces of the rack attach to each other by one piece sliding over, onto or into another piece.

Yet another specific object of the invention is to provide an all-purpose cargo platform with a vertical support member against which cargo can be braced. The vertical support member being capable of being used as a tie-down point to support cargo in the vertical direction.

Further objects and advantages of the current invention will become apparent from a consideration of the drawings and ensuing descriptions.

BRIEF DESCRIPTION OF THE DRAWINGS

FIG. 8 is an isometric view of the crossbar.

FIGS. 9A & B are isometric views of the elongate members.

FIGS. 10A & B are plane views of the anti-wobble connectors.

DESCRIPTION OF THE PREFERRED EMBODIMENT

Figure 1:
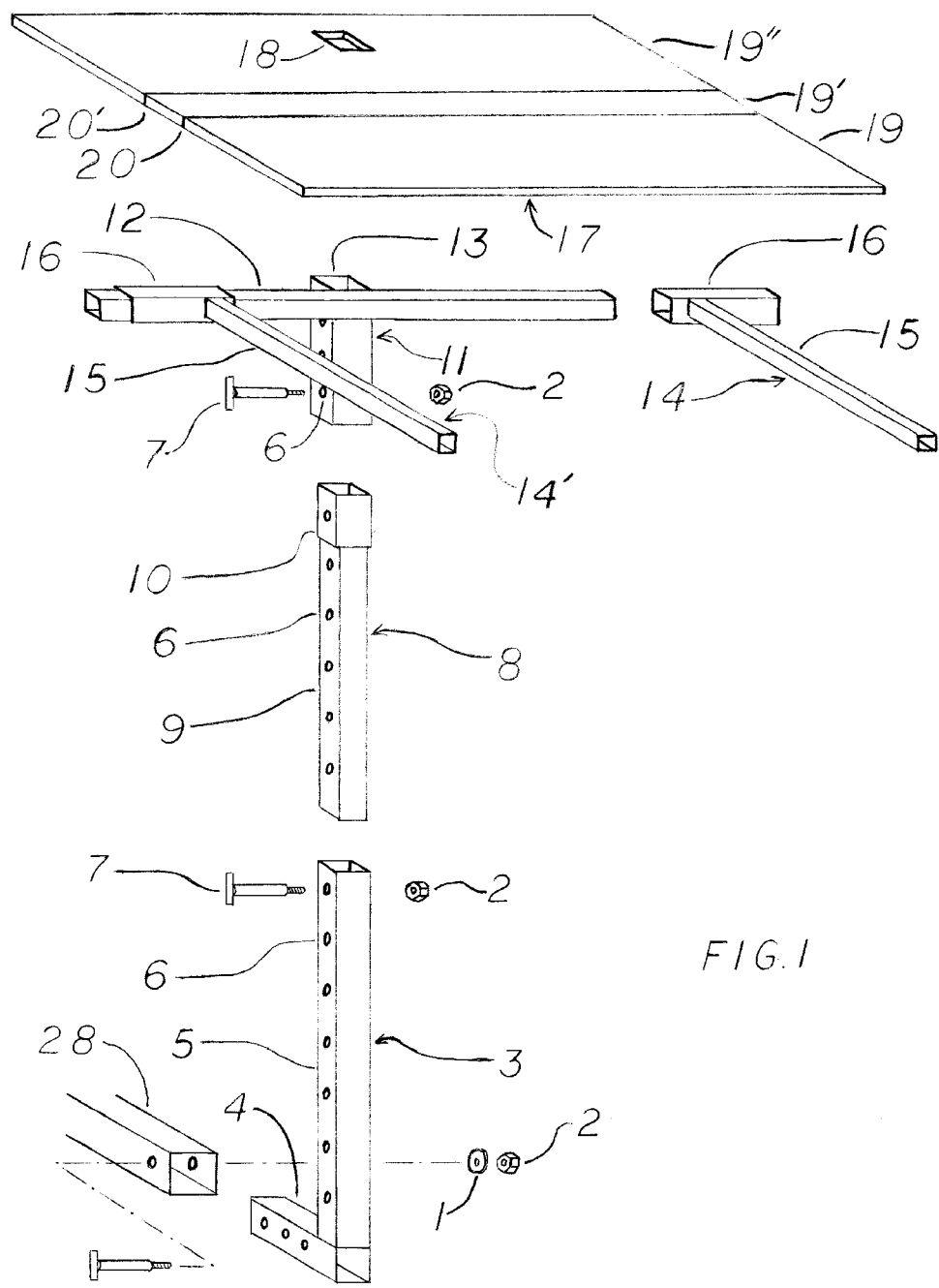
FIG. 1 is a partially exploded isometric view of the rack system oriented in a vertical plane.
Figure 12A:
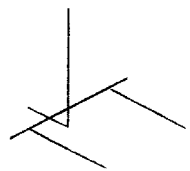
FIGS. 12A–12T are schematic drawings of the 20 most useful and practical configurations of the rack system.
Figure 12B:
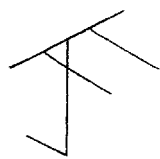
Figure 12C:
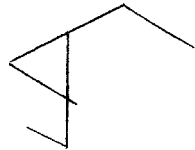
Figure 12D:
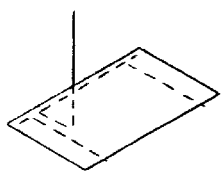
Figure 12E:
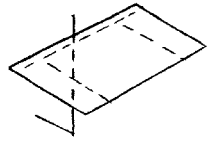
Figure 12F:
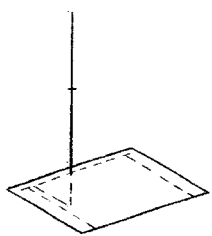
Figure 12G:
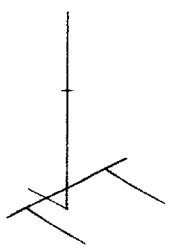

FIG. 1 displays the elements of the rack system in a partially exploded view, disposed in a vertical direction. In this general orientation, the rack system can be configured as:

- as a bicycle rack (FIG. 12B)
- as an all-purpose cargo platform (FIGS. 12D & 12F)
- as a pair of horizontal arms, which can be positioned at various heights and whose spacing can be varied horizontally, on which to load cargo (FIGS. 12A & 12G)
- as a pair of horizontal arms, which can be positioned at various heights and whose spacing can be varied horizontally, from which cargo can be suspended (FIG. 12C)
- as a work surface or a tail gate table (FIG. 12E)
- as the rear portion of a variable-height roof rack (FIGS. 12H–12J)
- as a base for easily attaching accessories to transport specialty items (FIGS. 12A–12C & FIGS. 12G–12J)

The "L" shaped member (3) is attachable to a receiver hitch (28) by shoulder bolt (7), washer (1) and a nut (2). The washer (1) must be sufficiently large and strong to convey the clamping force of the bolt and nut without significantly distorting into the larger hole in the receiver hitch—see FIG. 10B. The cross bar (11) may be attached to either the "L" shaped member (3) or to the larger end of the extension (10), also by a shoulder bolt (7) and a nut (2) (in practice, a conventional washer—not shown—is used to keep the nut from scratching the crossbar). Using the larger holes (6) and the smaller holes (not shown) on the opposite side of the "L" shaped member, and of the crossbar, along with the shoulder bolts (7) and nuts (2), the crossbar may be firmly attached at any convenient height along the "L" shaped member. Likewise, the smaller end of the extension (9) may be telescopically inserted into the longer leg of the "L" shaped member (5) and, with the aid of the larger and smaller holes, and the shoulder bolts and nuts, be firmly attached at any convenient height. The elongate members (14 & 14') slide onto the horizontal segment of the cross bar and my be attached at any convenient location, depending on width of the load to be carried. FIG. 1 shows one elongate member in place on the crossbar, and another in an exploded view away from the end of the crossbar. The combination of the cross bar and the two elongate members form the base on which the folding platform (17) rests. If the folding platform is placed at the lowest position on the "L" shaped member, at approximately bumper height, it can serve as an all-purpose cargo platform—see FIG. 12D. By attaching the platform, and its supporting members, further up the "L" shaped member, it can be used as a work surface or as a tail gate table—see FIG. 12E.

The cross bar and the elongate members can be used without the platform. When placed at a lower level, cargo which doesn't need the platform can be placed directly on the bars—see FIG. 12A. At a higher level, the elongate members can be positioned to form a bike rack capable of carrying up to four bikes—see FIG. 12B. Likewise, the crossbar with the elongate members attached can be placed at various heights, and the elongate members can be placed at various widths for the purpose of carrying or suspending various cargos—see FIG. 12C.

Figure 12H:
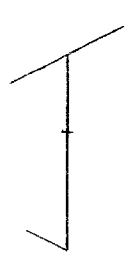
Figure 12I:
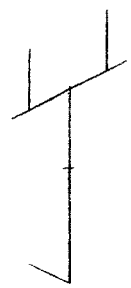
Figure 12J:
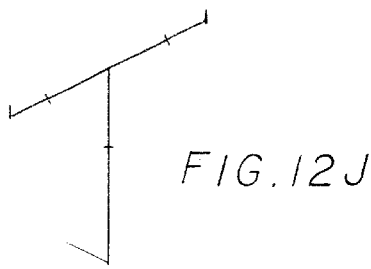
Figure 12K:
Figure 12L:
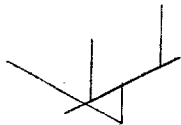
Figure 12M:

When the cross bar is attached to the larger end of the extension, and the extension is attached to the longer leg of the "L" shaped member, the height of the cross bar can be adjusted so that it can become the rear portion of a variable-height roof rack—FIGS. 12H–12J. At this height, the elongate members can be used in two separate ways: 1) for cargo that is narrower than the horizontal segment of the cross bar, the slide means can be slid onto the cross bar, abutting the cargo, with the longer, weight-bearing segment pointing vertically—FIG. 12I. When both elongate members are attached in this manner, they form positive stops to keep the cargo from shifting. For cargo wider than the cross bar, the longer segments of the elongate members can be telescopically inserted into the ends of the cross bar. With the slide means pointed vertically and abutting the cargo, they form a positive stop to keep the cargo from shifting—FIG. 12J.

Figure 2:
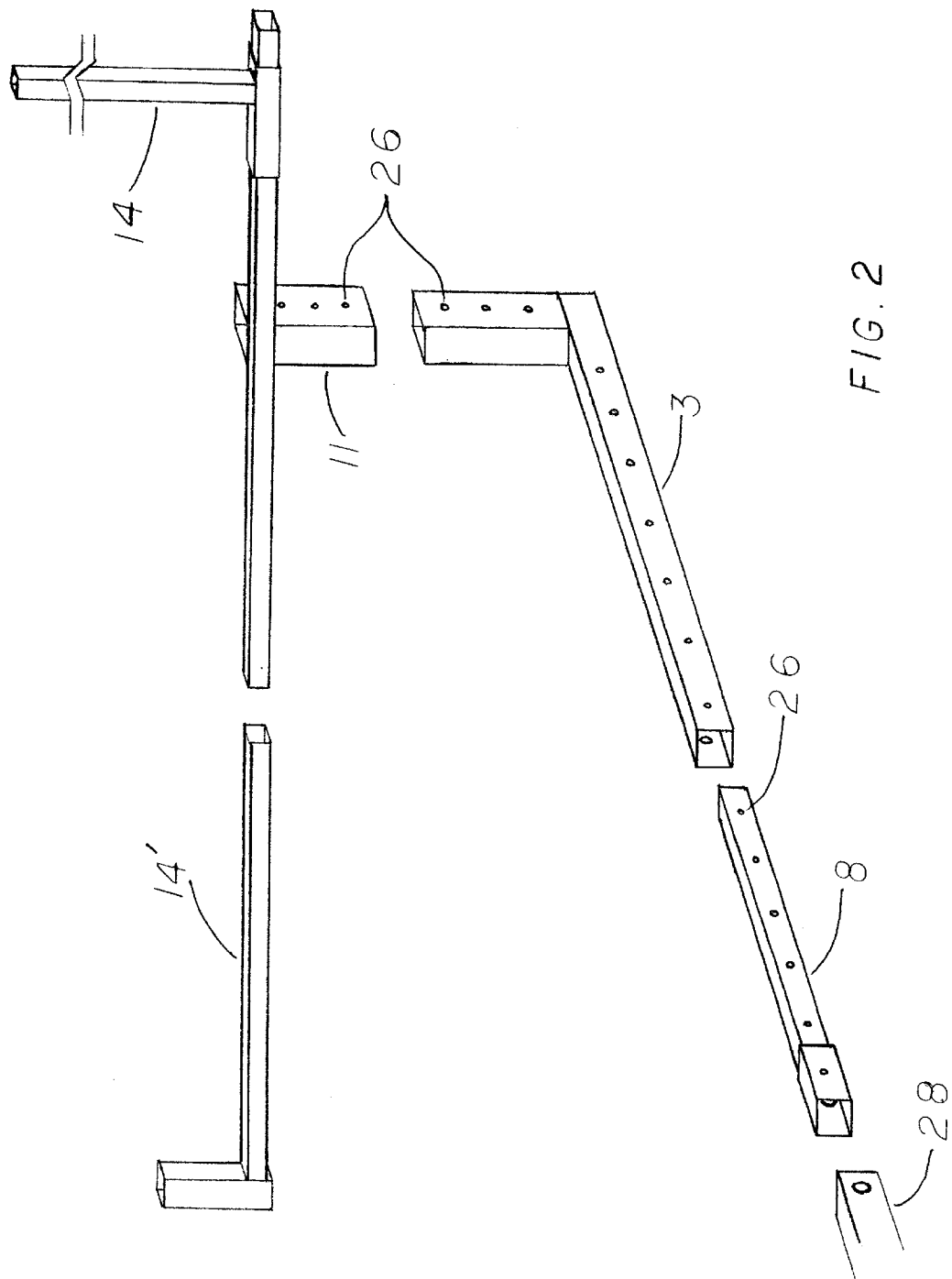
FIG. 2 is a partially exploded isometric view of the rack system oriented in a horizontal plane.

FIG. 2 displays the metal pieces of the rack system in a partially exploded isometric view disposed in a horizontal direction; the nuts (2), bolts (7) and washer (1) have been omitted for clarity. In this view, the smaller holes (26) are clearly seen in the extension, the "L" shaped member and the crossbar, while the matching and corresponding larger holes (6) are unobservable on the opposite side of each piece. In this general orientation, the rack system can be configured as:

a variable length bed extender to a pickup truck, SUV, van or even a car (FIGS. 12K–12P)

an entirely new type of rack which can safely and independently carry cargo several feet behind a vehicle to allow easy access to the rear of the vehicle (FIG. 11 and FIGS. 12Q–12T)

a base for easily attaching accessories to transport specialty items (FIGS. 12K–12Q and FIGS. 12S & 12T).

Figure 11:
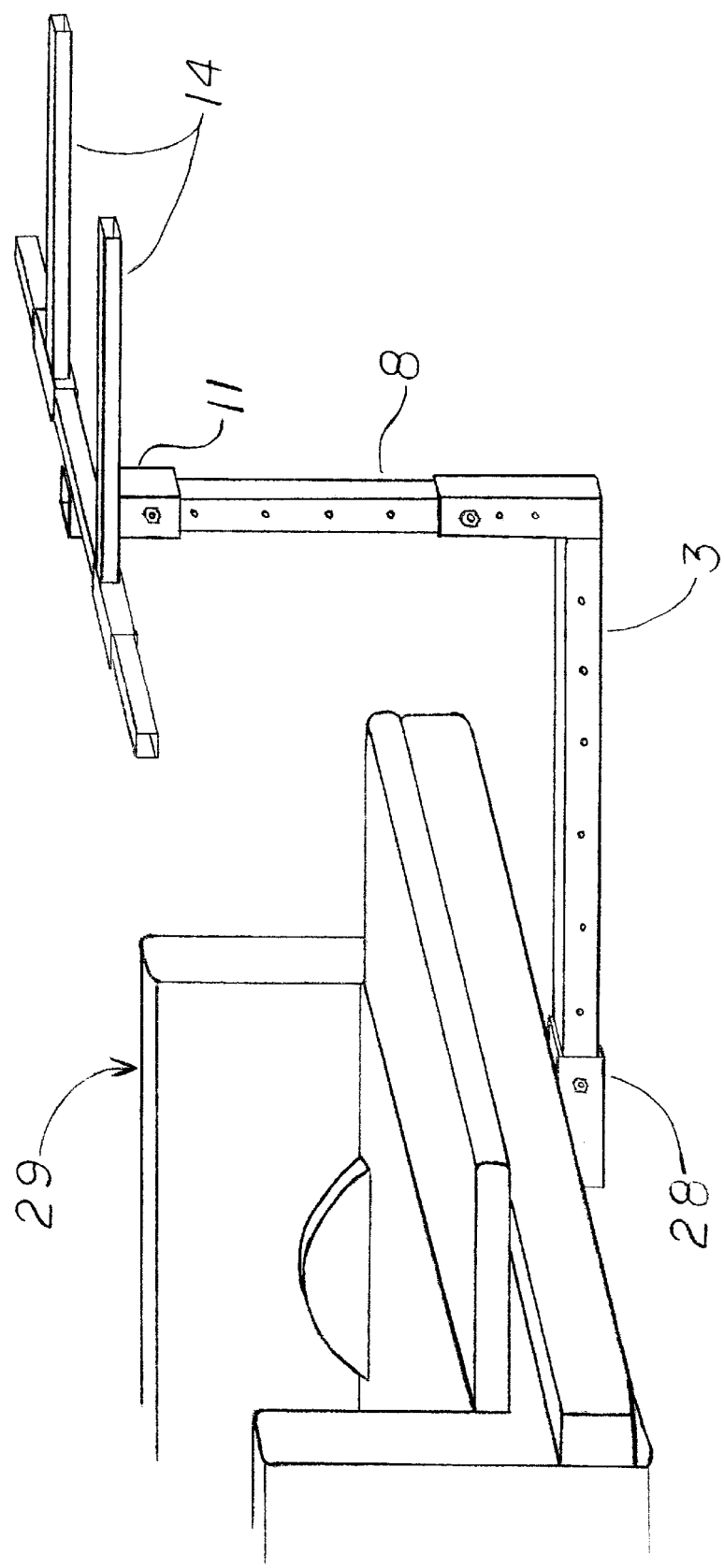
FIG. 11 is an isometric view of the rack system configured to safely and independently carry cargo several feet behind a vehicle to allow easy access to the rear of the vehicle.
Figure 12N:
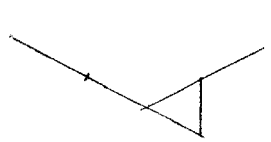
Figure 12O:
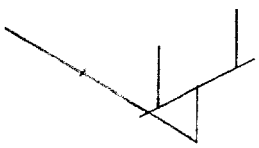
Figure 12P:
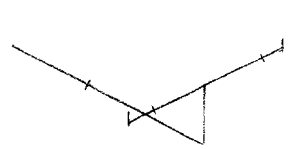
Figure 12Q:
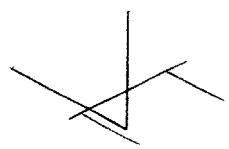
Figure 12R:
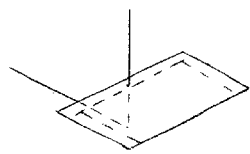
Figure 12S:
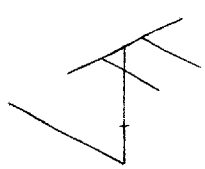
Figure 12T:
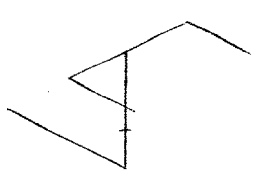

Just as in FIG. 1, each piece in FIG. 2 is capable of being utilized in several different ways, e.g., the extension can be attached between a receiver hitch (28) and the longer leg of the "L" shaped member to create a variable length bed extender—see FIGS. 12N–12P, or it can be attached to the shorter leg of the "L" shaped member to add height to the setting of the cross bar—see FIG. 11 and FIGS. 12S & 12T. Likewise, the elongate members can be used as crossbar ends and as crossbar extensions for various widths of cargo, as described above for the roof-height rack configuration—see FIGS. 12L, M, O, & P.

Figure 3:
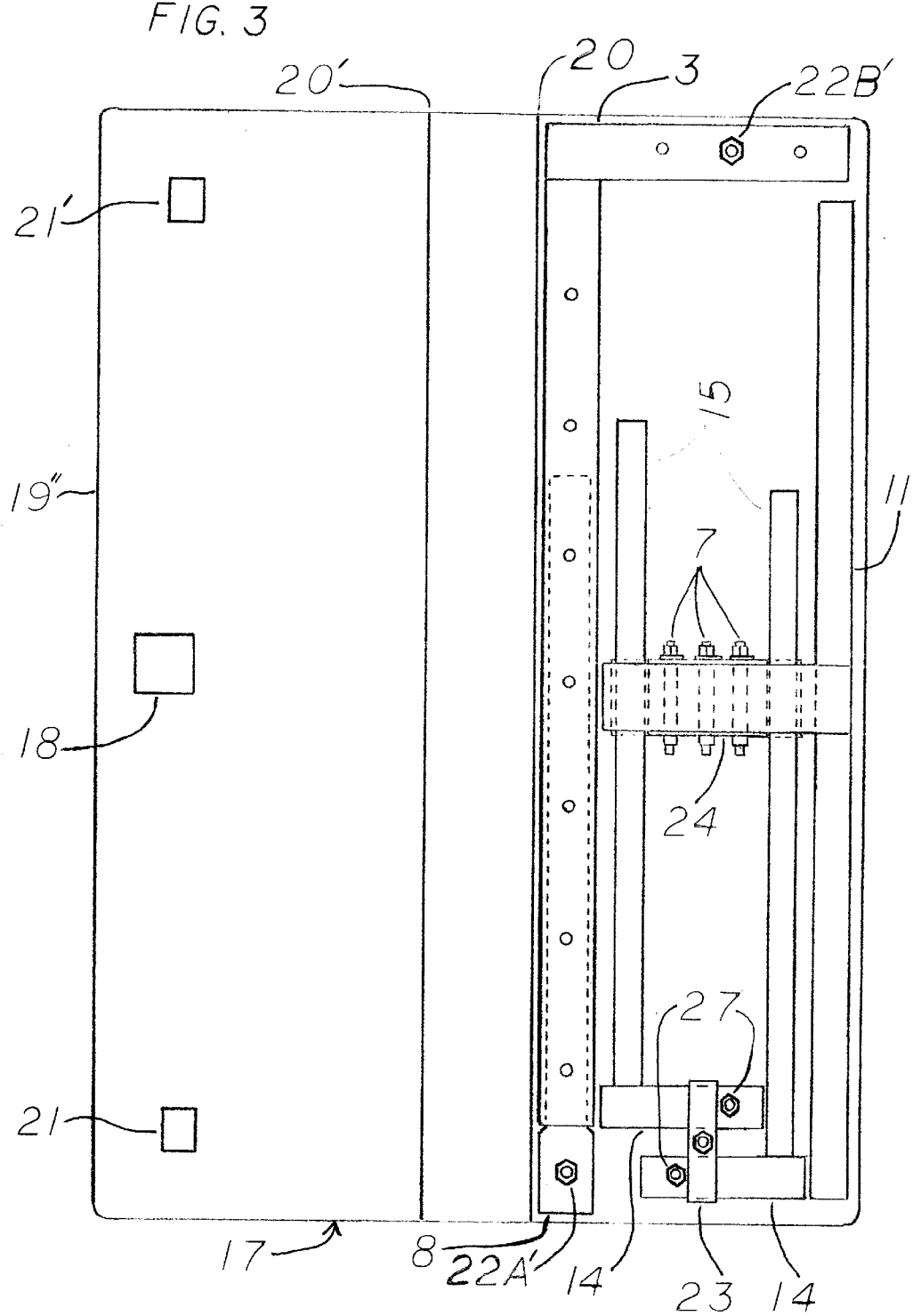
FIG. 3 is a plane view of the metal rack pieces attached to the underside of the folding platform.
Figure 4:
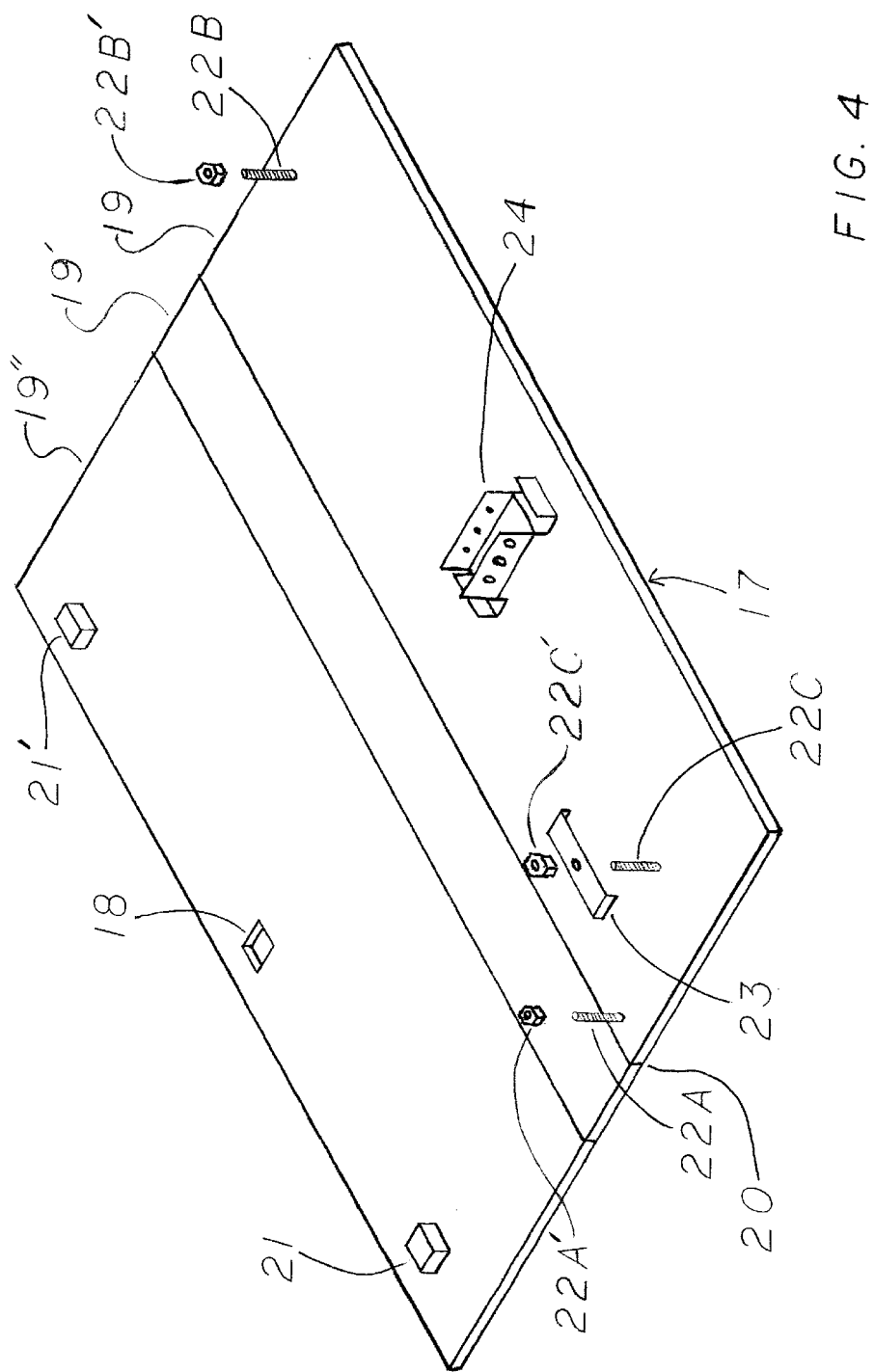
FIG. 4 is a partially exploded isometric view of the attachment and holding means on the underside of the folding platform.

FIGS. 3 & 4 show one possible configuration of how the metal rack pieces can be stored on the underside of the folding platform (17). Only two studs (22A & 22B) and their associated nuts (22A' & 22B') are needed to securely attach both the "L" shaped member (3) and the extension (8) in place. In this configuration, the extension is telescopically inserted into the longer leg of the "L" shaped member to save space. A third stud and nut (22C & 22C' seen in FIG. 4), in conjunction with brackets 23 & 24, secures the elongate members (14) in place. Bracket 24, in conjunction with the three shoulder bolts (7) and nuts (2) secure the cross bar (11). With the cross bar in place, the longer segment of each of the elongate members (15) is trapped under it, further securing them. When the folding platform (17) is resting on the horizontal segment of the cross bar (12) and the elongate members (14), holding means (21 & 21') abut the cross bar and, in conjunction with the "L" shaped member (3) which protrudes through hole 18, serve to keep the folding platform in place. In another embodiment, different holding means could be used to hold the platform on the bars without the need for the "L" shaped member.

Figure 5:
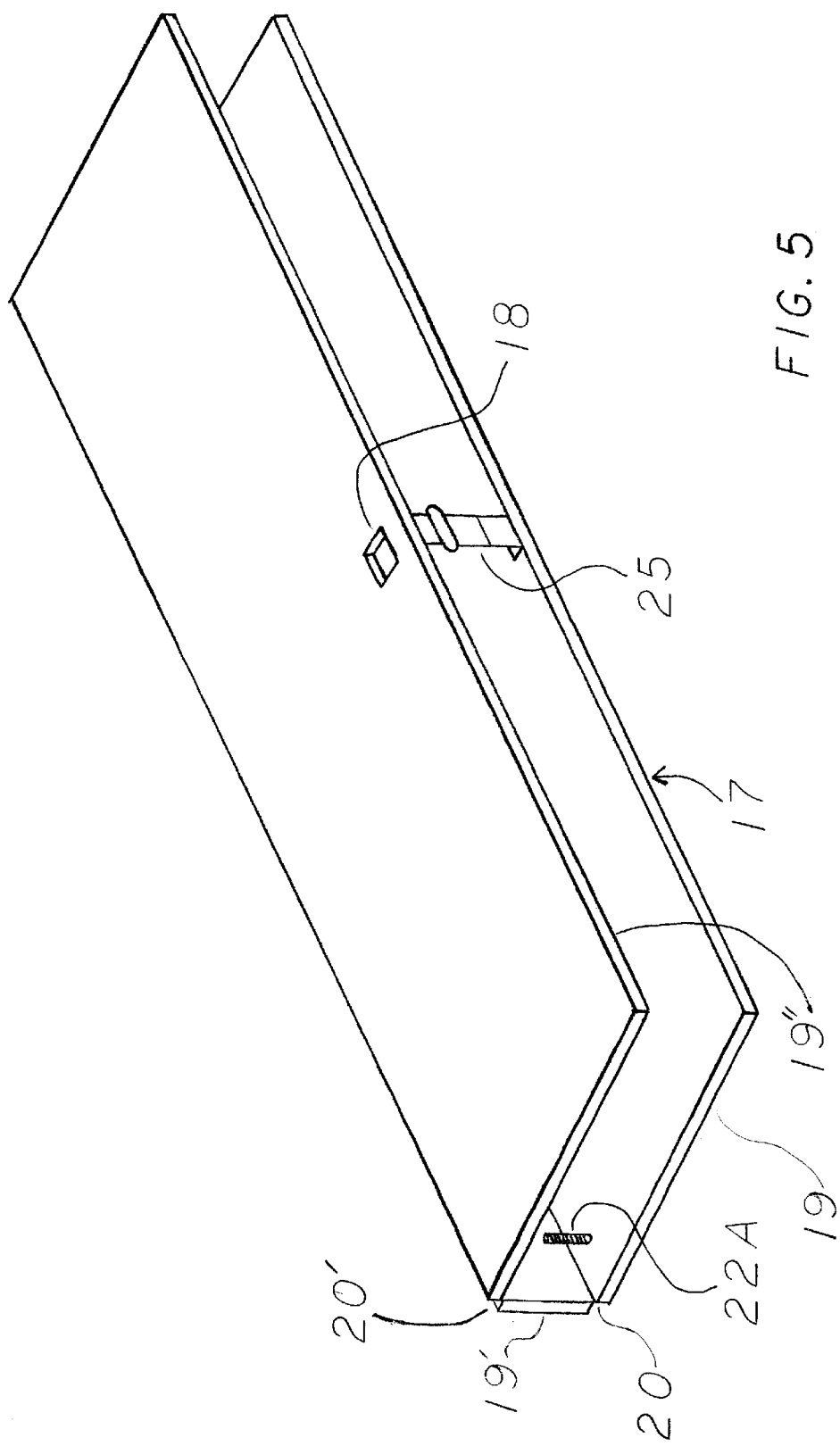
FIG. 5 is an isometric view of the folded platform.

FIGS. 4 & 5 clearly display the three segments of the folding platform (19, 19' & 19") and the two hinge areas (20 & 20'). From the open, flat view of FIGS. 3 & 4, the platform can be folded into a three sided container as shown in FIG. 5 and secured with closure means (25) to securely house the metal pieces of the rack system inside. As illustrated, closure means (25) is a simple oval ring attached to the proximal side of the platform by any conventional means. A hook-and-loop strip is attached to the distal side. The hook-and-loop strip is inserted through the oval ring, folded back and attached to itself to hold the proximal and distal sides of the platform firmly against the metal rack pieces (not shown) inside. Other standard closure means could be substituted to hold the platform closed.

Figures 6A, 6B:
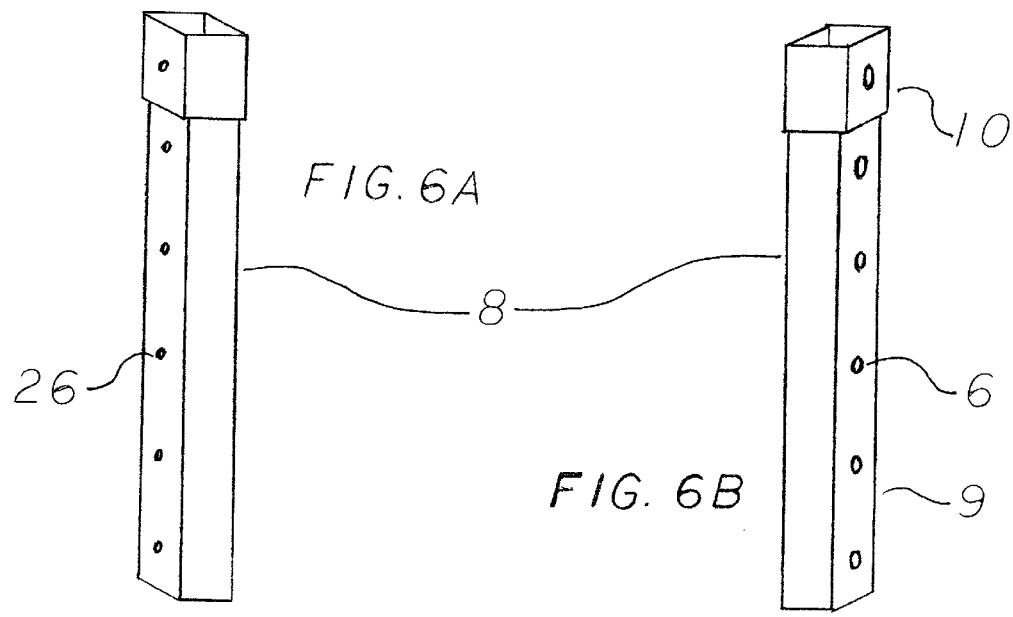
FIGS. 6A & B are isometric views of the extension.

FIGS. 6A & 6B show the right and left sides of the extension (8). The larger end (10) is made of the same sized tubing as the "L" shaped member. This allows it to be connected to either the crossbar or to the receiver hitch. The smaller end (9) is sized to telescopically slide inside of either leg of the "L" shaped member.

Figures 7A, 7B:
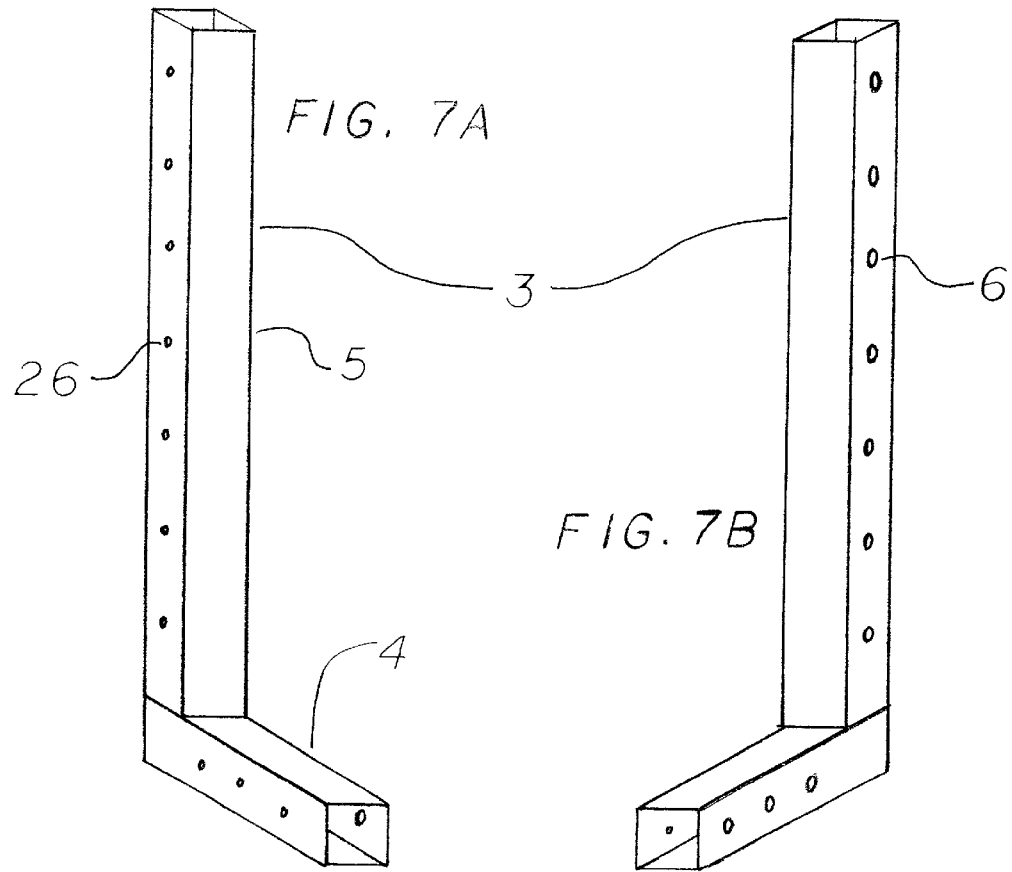
FIGS. 7A & B are isometric views of the "L" shaped member.

FIGS. 7A & 7B show the right and left sides of the "L" shaped member (3). The two pieces of metal are connected together at an approximate 90 degree angle. Both the shorter leg (4) and the longer leg (5) are sized to telescopically slide into a standard receiver hitch. Thus, either leg can attach to: 1) a receiver hitch, 2) the extension, or 3) the crossbar. This intentional design flexibility helps to create the multiple configurations that this rack system can assume.

FIGS. 6A & B and FIGS. 7A & B show the larger holes (6) on one side and the smaller holes (26) on the other side of both the extension (8) and the "L" shaped member (3). FIG. 10A shows a portion of the "L" shaped member (3) inserted into a portion of the shorter/vertical segment of the cross bar (13). In conjunction with the shoulder bolts (7) and their nuts (2), the different sized holes (6 & 26) in all of these pieces allow the rack system to be connected, one piece to another, eliminating all wobble. FIG. 10B is similar, but it shows how one leg of the "L" shaped member (3) can be attached to a standard receiver hitch (28) with the addition of a strong washer (1), thereby creating an anti-wobble connection. Both FIGS. 10A & 10B clearly show the "T" handle (30) and the rounded, threaded end (31) of the shoulder bolts. The "T" handle is of a predetermined size to allow an average person to apply adequate torque to this end of the shoulder bolt when a wrench is used to tighten or loosen a nut on the threaded end. The rounded, threaded end allows the shoulder bolt to be self-centering as it is inserted through the smaller holes (26).

FIG. 8 shows the details of the cross bar (11). The cross bar is comprised of a shorter, vertical segment (13), and a longer, horizontal segment (12). The vertical segment (13) is sized to slide over either leg of the "L" shaped member (3) or over the larger end of the extension (10). The vertical segment has a multiplicity of larger holes (6) and corresponding and matching smaller holes (26—not viewable) in it. These holes are sized to receive a shoulder bolt (7). The horizontal segment is attached to the vertical segment such that no part of the vertical segment extends above the upper edge of the horizontal segment. The horizontal segment is the attachment point for the elongate members.

FIGS. 9A & 9B show the elongate members (14 & 14'), each of which is comprised of a shorter, slide means (16) and a longer, weight-bearing segment (15). The weight-bearing segment is aligned with one side of the slide means so that the platform rests on a continuous, flat surface formed by these two pieces. Nut (27) is welded over a hole (not shown) in the slide means. Preferably, the nut and hole are on the opposite side of the slide means from the side which is aligned with the weight-bearing means. When the slide means (16) of the elongate member is slid on the horizontal segment (12) of the cross bar, and a bolt (not shown) is screwed into the nut, the member can be secured at any point by tightening the bolt. The longer, weight-bearing portion of the elongate members can be positioned to point up, to point horizontally towards the vehicle or away from the vehicle, depending on the shape and weight distribution of the cargo. When not in use, they can also be positioned to point downwards, to keep them safely out of the way. Either elongate member can be placed on either side of the horizontal segment of the crossbar.

The weight-bearing segments of the elongate members are sized to be telescopically inserted into either end of the horizontal segment of the crossbar to form crossbar extensions. No fastening means is needed to connect the weight-bearing segment to the horizontal segment. In practice, the slide means would be pointed vertically and would be slid up against the edge of the cargo as it rested on the crossbar, to form a positive stop. A tight tie-down means, e.g., a cargo strap with a ratchet tightener, would be connected from the outer end of one of the elongate members, up and over the cargo and down to the outer end of the other elongate member. When the strap is tightened, the friction between the weight-bearing segment as it telescopically rests inside of the horizontal segment of the crossbar, would be great enough to keep both the elongate members and the cargo from shifting.

FIG. 11 is an isometric view of the schematic FIG. 12S. It is a serendipitous new type of rack which is made possible by both the flexibility of the design of the current invention and the strength and solidness of the rack members when they are connected together by the shoulder bolts. FIG. 11 illustrates a rack which can safely and independently carry bicycles and other cargo several feet behind a vehicle (29) to allow easy access to the rear of the vehicle—see FIGS. 12Q, R & T for variations of this configuration. In two variations of this configuration, FIGS. 12Q & 12R, the crossbar and elongate members can be lowered and connected to the shorter leg of the "L" shaped member, either with or without the platform. If it were desirable to have the crossbar and elongate members (with or without the platform) at some other height than at the lowest or highest position, the larger end of the extension could be attached to the receiver hitch and the shorter leg of the "L" shaped member could be attached to the extension so that the crossbar could be attached at any of the regularly spaced holes along the length of the longer leg of the "L" shaped member.

Although preferred embodiments of the rack system of the present invention have been illustrated and described, it is to be understood that the present disclosure is made by way of example and that various other embodiments are possible without departing from the subject matter coming within the scope of the following claims, which subject matter is regarded as the invention.

The embodiments of the invention in which an exclusive property or privilege is claimed are defined as follows:

1. A multi-configuration, multi-purpose carrying rack system attachable to a vehicle for transporting a variety of items, said rack system made of multiple major pieces comprising:

at least one "L" shaped member made of tubing having a shorter leg and a longer leg, said member having a right side and a left side, and either the right side or the left side having a multiplicity of holes which are larger in diameter than a series of matching and corresponding holes on the opposite side; both ends of the "L" shaped member being sized to fit within a receiver hitch and having the larger holes sized and placed to match the holes in either side of the receiver;

at least one extension made of tubing to the at least one "L" shaped member, said extension having a larger end and a smaller end, in which the smaller end is sized to telescopically fit within either arm of the "L" shaped member; said extension having a larger end made of the same sized tubing as the "L" shaped member; said extension having larger holes on one side with matching and corresponding smaller holes on the opposite side, similar in size to, and capable of being lined up with similar larger and smaller holes in the "L" shaped member;

at least one slidably removable crossbar made of tubing with a longer horizontal segment and a shorter vertical segment, said vertical segment being a slidable means made of tubing sized to slidably fit over either end of the "L" shaped member; said slidable means having larger holes on one side with matching and corresponding smaller holes on the other side, similar in size to, and capable of being lined up with similar larger and smaller holes in the "L" shaped member;

at least two slidably removable elongate members made of tubing, each member comprised of a slidable segment attached to an elongate, weight-bearing segment, said slidable segment being sized to fit over said horizontal segment of said crossbar; said slidable segment including an attachment means for firmly attaching said at least two elongate members at multiple points along said horizontal segment of said crossbar; said weight-bearing segment of each elongate member being sized to slidably be inserted within either end of said horizontal segment of said crossbar;

a folding platform having a proximal side and a distal side, said proximal side having at least one opening therein, said opening sized to slidably fit over said at least one "L" shaped member; said platform having a plurality of segments with each segment being attached to its neighbor by at least one hinge means;

wherein said at least one "L" shaped member, said at least one extension, said at least one crossbar, said at least two elongate members, and said folding platform are rearrangable to form a multiplicity of rack configurations, including, but not limited to: a variable length bed extender for pickup trucks, vans, SUV's and cars, an entirely new type of rack which can safely and independently carry cargo several feet behind a vehicle to allow easy access to the rear of the vehicle, a pair of horizontal arms, which can be positioned at various heights and whose spacing can be varied horizontally, on which cargo can be loaded, an all-purpose cargo platform, a bike rack, a tail gate table, a pair of horizontal arms, which can be positioned at various heights and whose spacing can be varied horizontally, from which cargo can be suspended, the rear portion of a variable-height roof rack, and as a base for easily attaching accessories to transport specialty items.

2. The multi-configuration, multi-purpose carrying rack system of claim 1 wherein said folding platform has a top side for carrying cargo and an opposing, underside; said platform being capable of being folded into at least a three sided container to house the metal pieces of the rack system for packaging, shipping, display and storage; and said platform having a plurality of holding means on its underside for the purpose of releasably holding the metal pieces of the rack system for packaging, shipping, display and storage; and said folding platform having a closure means to hold the platform closed to keep the metal pieces of the rack system contained therein for packaging, shipping, display and storage.

3. The multi-configuration, multi-purpose carrying rack system of claim 2 wherein said folding platform has at least one holding means on its underside capable of holding the platform in place on top of the crossbar and elongate members when said folding platform is being used as an all-purpose cargo platform, as a work surface, or as a tail gate table.

4. The multi-configuration, multi-purpose carrying rack system of claim 1 wherein the weight-bearing segment of each of the elongate members is attached closer to one end of the slidable segment than the other end, producing an asymmetry; said at least two elongate members being mirror images of each other.

5. The multi-configuration, multi-purpose carrying rack system of claim 4 wherein the weight-bearing segment of each of the elongate members is sized to telescopically slide into either end of the horizontal segment of the crossbar; in use, when said load carrying segment of each elongate member is telescopically inserted into an end of the horizontal segment of said crossbar, said elongate member is kept in place by friction between these two members when said friction is enhanced by the tension of a cargo tie-down means.

6. The multi-configuration, multi-purpose carrying rack system of claim 1 further including a novel, anti-wobble connector which is used to connect one part of the rack system to another part, to include, but not be limited to: connecting the "L" shaped member to a receiver hitch; connecting the extension to the "L" shaped member; connecting the extension to a receiver hitch; connecting the crossbar to the "L" shaped member; connecting the crossbar to the extension; said connector consisting of a shoulder bolt of predetermined length in which the body of the bolt is sized to fit through the larger holes of the "L" shaped member, and the threaded segment of the shoulder bolt is sized to fit through the smaller holes of the "L" shaped member, said threaded segment capable of being inserted through the larger holes and through the smaller holes to urge any two of the items above firmly together when a nut is screwed tightly on the threads, thus negating all wobble; said threaded end of said shoulder bolt having a means to self-center when being inserted into said smaller holes; said shoulder bolts may be of either the conventional variety or may be fitted with handles.

7. The novel anti-wobble connector of claim 6 further including a washer under the nut which has an outside diameter larger than the pin retaining hole in a receiver hitch and which is strong enough to withstand deformation of less than its elastic limit under normal use conditions when said novel anti-wobble connector is used to connect a part of the rack system to a receiver hitch.

8. The multi-configuration, multi-purpose carrying rack of claim 2 wherein the dimensions of the rack system parts are of predetermined sizes to easily fit within said at least three sided container formed by the folding platform.

9. The multi-configuration, multi-purpose carrying rack of claim 2 wherein the dimensions of the folding platform are of a predetermined size to easily fit within the cargo carrying area of a vehicle.

10. The multi-configuration, multi-purpose carrying rack of claim 1 wherein each of the major pieces of the rack system slidably attach to at least one of the other rack pieces.

11. The multi-configuration, multi-purpose carrying rack of claim 2 wherein the longer leg of the "L" shaped member, when situated vertically, can be used to abut cargo against to provide support in the vertical direction for cargo which is resting primarily on the all-purpose cargo platform, or on the elongate members.

12. The multi-configuration, multi-purpose carrying rack of claim 11 wherein the extension is attached to the longer leg of the "L" shaped member to provide vertical support for cargo items which are taller than the longer leg of the "L" shaped member.

13. The multi-configuration, multi-purpose carrying rack of claim 11 wherein the longer leg of the "L" shaped member is used as a tie-down point to support cargo in the vertical direction.

14. The multi-configuration, multi-purpose carrying rack of claim 12 wherein the extension can be used as a tie-down point to support cargo taller than the longer leg of the "L" shaped member.

\* \* \* \* \*